United States Patent [19]

Iwashita et al.

[11] 4,427,637

[45] Jan. 24, 1984

[54] APPARATUS FOR PRODUCING AN ALKALI METAL SALT OF A MINERAL ACID, AND A PROCESS

[75] Inventors: Hidemaro Iwashita, Tokyo; Fumiaki Mieno, Nobeoka; Yoshinori Kiura, Nobeoka; Kenichi Hayashi, Nobeoka, all of Japan

[73] Assignee: Asahi Kasei Kogyo Kabushiki Kaisha, Osaka, Japan

[21] Appl. No.: 307,164

[22] Filed: Sep. 30, 1981

[30] Foreign Application Priority Data

Sep. 30, 1980 [JP] Japan .............................. 55-135305
Jul. 3, 1981 [JP] Japan .............................. 56-103173

[51] Int. Cl.³ .......................... B01F 7/04; C01B 7/01; C01D 5/02
[52] U.S. Cl. .................................. 422/198; 422/229; 422/233; 366/300; 423/482; 423/552
[58] Field of Search ................ 423/552, 482; 422/229, 422/233, 210, 224, 225, 228, 205; 366/300, 301

[56] References Cited

U.S. PATENT DOCUMENTS

| | | | |
|---|---|---|---|
| 1,145,898 | 7/1915 | Howard | 423/482 |
| 1,165,815 | 12/1915 | Thelen et al. | 423/482 |
| 1,486,358 | 3/1924 | Skinner | 423/552 |
| 1,498,286 | 6/1924 | Marsh | 366/300 |
| 1,697,390 | 1/1929 | Kipper | 423/482 |
| 1,871,416 | 8/1932 | Broadfield | 422/225 |
| 2,082,809 | 6/1937 | Pennell | 71/61 |
| 2,706,144 | 4/1955 | Cannon | 423/552 |
| 3,684,458 | 8/1972 | McCammon et al. | 422/225 |
| 4,303,619 | 12/1981 | Kobayashi et al. | 423/552 |
| 4,342,737 | 8/1982 | Iwashita et al. | 423/552 |

FOREIGN PATENT DOCUMENTS

| | | | |
|---|---|---|---|
| 1255098 | 11/1967 | Fed. Rep. of Germany | 422/210 |
| 2950404 | 6/1980 | Fed. Rep. of Germany | 423/552 |
| 35-2264 | 3/1960 | Japan | 422/205 |
| 134214 | 3/1920 | United Kingdom | 423/552 |
| 478217 | 1/1938 | United Kingdom | 423/552 |
| 2053881 | 2/1981 | United Kingdom | 423/552 |
| 2054810 | 2/1981 | United Kingdom | 423/552 |

OTHER PUBLICATIONS

In re Edwards, 109 USPQ38, Apr. 18, 1956.

*Primary Examiner*—Gary P. Straub
*Attorney, Agent, or Firm*—Finnegan, Henderson, Farabow, Garrett & Dunner

[57] ABSTRACT

An apparatus is disclosed for producing an alkali metal salt of a mineral acid, characterized by the provision of a specific agitating means, said agitating means having a pair of shafts adapted to contra-rotate and a plurality of columnar agitating elements securely attached to each of said pair of shafts and being so constructed that it forcibly causes the migration of the reaction mixture at least in the region where the liquid phase of the reaction mixture is substantially continuous and forcibly causes the kneading of the reaction mixture at least in the region where the solid phase of the reaction mixture is substantially continuous. A process is also disclosed for producing an alkali metal salt of a mineral acid, characterized in that the reaction between an alkali metal chloride and a mineral acid is effected in the apparatus as described above while allowing the state of the reaction mixture to be transferred from a slurry or capillary state to a pendular or dry state via a funicular II state and a funicular I state with the progress of the reaction; that the reaction mixture is impelled to migrate at least in a region ranging from the zone in which the reaction mixture assumes a capillary state to the zone in which the reaction mixture assumes a funicular I state; and that the reaction mixture is forcibly kneaded at least in a region ranging from the zone in which the reaction mixture assumes a pendular II state to the zone in which the reaction mixture assumes a pendular state. Thereby, a desired product can be continuously, stably obtained with high efficiency.

7 Claims, 5 Drawing Figures

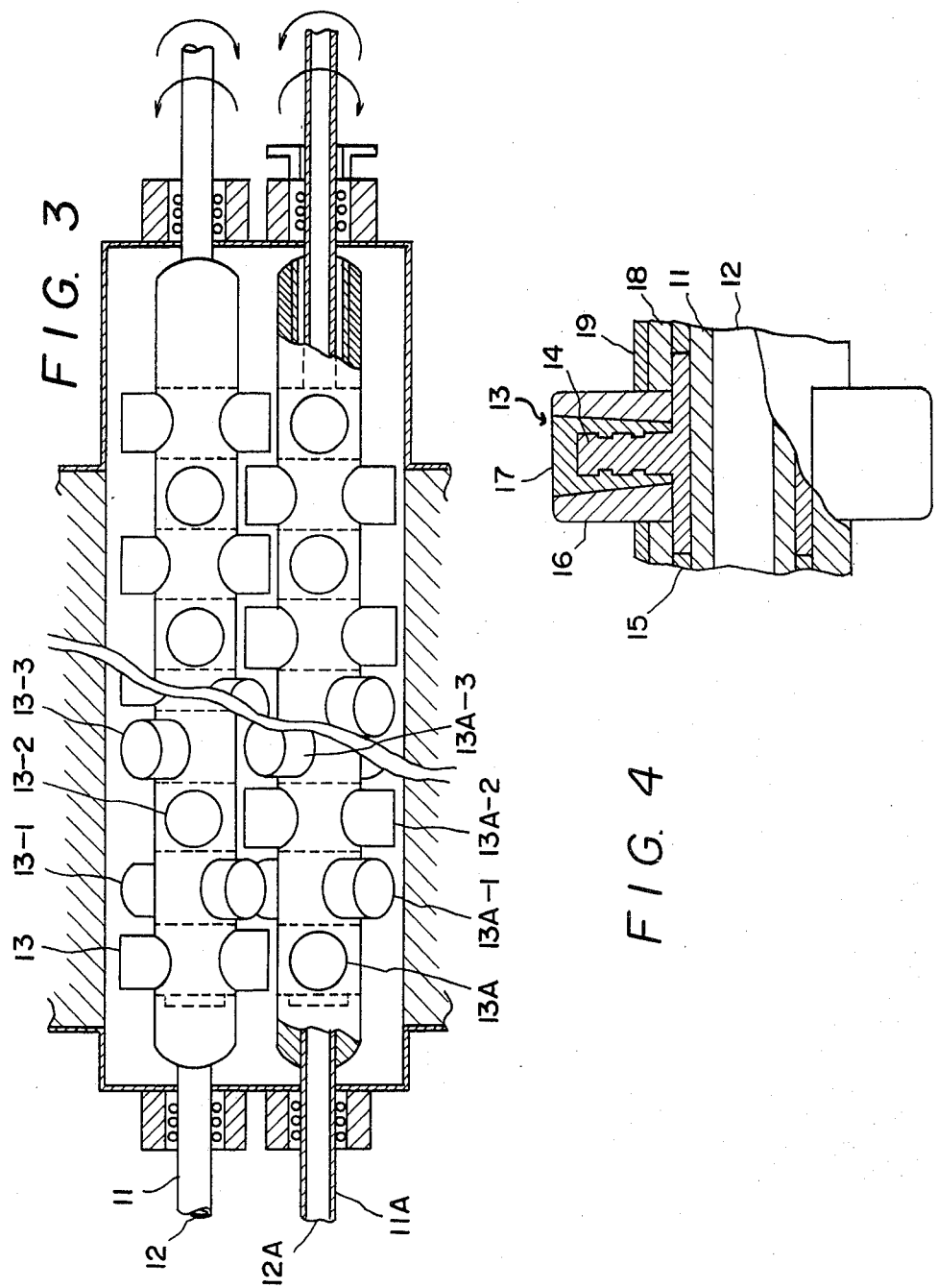

APPARATUS FOR PRODUCING AN ALKALI METAL SALT OF A MINERAL ACID, AND A PROCESS

This invention relates to an apparatus and a process for producing an alkali metal salt of a mineral acid. More particularly, it relates to an apparatus and a process for continuously producing an alkali metal salt of a mineral acid and hydrogen chloride from an alkali metal chloride and a mineral acid.

The production of an alkali metal salt of a mineral acid, for example, potassium sulfate is known. That is, it is well known to react potassium chloride with sulfuric acid at high temperature and in the absence of a catalyst to produce potassium sulfate and hydrogen chloride via potassium bisulfate according to the reactions represented by the following formulae.

$$KCl + H_2SO_4 = KHSO_4 + HCl \quad (1)$$

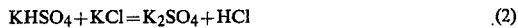

$$KHSO_4 + KCl = K_2SO_4 + HCl \quad (2)$$

In Japanese Patent Application Publication Specification No. 2264/1960, there is disclosed an apparatus for continuously effecting the above-mentioned reactions. This apparatus includes a horizontal type muffle furnace. According to the disclosure of the above-mentioned Japanese Patent Application Publication Specification, the apparatus has a horizontal type cylindrical muffle furnace and an agitator provided therein, said agitator being adapted to effect powerful, highly speedy and reversible agitation-mixing of the reaction system. In said Patent Application Publication Specification, however, there is not any specific description of an illustrative construction of the apparatus for realizing such agitation-mixing. In said specification, there is a description such that, (i) in case two agitator shafts are provided, it is necessary to determine the distance between the centers of the respective agitator shafts so that the agitating elements attached to one agitator shaft can alternately intervene with those of the other agitator shaft; and such that (ii) the agitator should preferably be devised to effect the most strong agitation at the portion corresponding to the initial reaction zone on the raw materials-charging side in the muffle furnace.

However, as a result of the researches by the present inventors, it has been revealed that, by the provision of the agitator as disclosed in Japanese Patent Publication Specification No. 2264/1960, a sufficient agitation-mixing cannot be attained when the reaction system is in a liquid-excess state. Thus, the above-mentioned prior art apparatus tends to cause only partial admixing when the reaction system is in a liquid-excess state and, is employable only where the reaction system is substantially in a dry and less fluid state. Accordingly, the prior art apparatus can be employed for the continuous production of an alkali metal salt of a mineral acid, for example, potassium sulfate and hydrogen chloride only when the following two operation conditions are satisfied so that the reaction mixture in the muffle furnace can be always maintained substantially dry during the course of the reaction. (1) Sulfuric acid should be employed in an amount less than the stoichiometrically equivalent amount relative to potassium chloride; and (2) potassium sulfate which has been formed and which is substantially in a dry state should be retained in a large quantity in the muffle furnace, and then potassium chloride and sulfuric acid should, after having been homogeneously admixed, be added little by little into the potassium sulfate and then subjected to the reaction with each other at once.

However, the reaction of potassium chloride with sulfuric acid to produce potassium sulfate and hydrogen chloride under such operation conditions is disadvantageous in that, when the reaction has proceeded to a certain extent leaving only small amounts of potassium chloride and sulfuric acid, difficulties are encountered in physical contact between the remaining potassium chloride and sulfuric acid because of intervention by the large quantity of the surrounding potassium sulfate (the reaction product) present in the reaction system. Especially when unreacted potassium chloride and potassium bisulfate are separately occluded in lumps of the solid potassium sulfate, it becomes impossible for them to get in contact with each other, and hence the reaction is practically interrupted. As a result, a considerable amount of chlorine is contained in the potassium sulfate product. According to the experiments by the present inventors, the rate of reaction extremely decreases at the time when the reaction has proceeded about 80% and the reaction ceases at the time when the reaction has proceeded about 90 to 95%. Accordingly, it is difficult to produce potassium sulfate of which the chlorine content is about 3% by weight or less. Furthermore, it takes much time for the prior art apparatus to carry out the reaction and, as a result, the prior art apparatus is subject to such a disadvantage that the productivity per furnace is low and energy cost is great.

It should be noted here that the use of potassium sulfate of which the chlorine content is as great as 1.0% by weight or more as a fertilizer often exerts unfavorable influences not only on the farm products but also on the farmland. Especially with respect to special kinds of plants such as tobacco, it is said that they are highly sensitive to and apt to have their growth hampered by the chlorine values contained in the chemical manure applied to the field thereof. Accordingly it follows that the use of potassium sulfate of which the chlorine content is more than 1.0% by weight is disadvantageously restricted. Conventionally, in order to obtain a potassium sulfate product having a chlorine content of not more than 1.0% by weight and having a widened application, the potassium sulfate product obtained by the use of, for example, the prior art apparatus as mentioned above is admixed with a small amount of sulfuric acid, followed by calcination of the resultant mixture at a temperature as high as about 800° C. in a rotary kiln. It is needless to say that the above-mentioned procedures are disadvantageously complicated and accompanied by much more energy consumption.

In order to resolve the above-mentioned problems, it is desired that, for example, in the case of the production of potassium sulfate, sulfuric acid is employed in an amount equal to or a little more than the stoichiometrically equivalent amount and the state of the reaction mixture in the muffle furnace starts in a slurry or capillary state and is finally brought into a pendular or dry state via a funicular II state and a funicular I state with the progress of the reaction. Kneading of the reaction mixture should be effected at least in a region ranging from the zone in which the reaction mixture assumes a funicular II state to the zone in which the reaction mixture assumes a pendular state. In case excess sulfuric acid is employed, a potassium sulfate product having a chlorine content of 0.5% by weight or less can be produced, in one step, under relatively mild conditions in a short period of time. With the conventional apparatus, however, it is difficult to not only effect the migration of the reaction mixture in the capillary-state zone and the funicular-state zone, but also sufficiently knead the reaction mixture in the funicular-state zone and pendular-state zone, and hence, the abovementioned technique cannot be industrially adopted. Furthermore, prior art apparatus including the one disclosed in Japanese Patent Publication Specification No. 2264/1960 are so poor in resistance to acids, heat, and wear that they cannot withstand the continuous and long-term operation under high level acidity and high temperature conditions such as are required in the production of potassium sulfate and hydrogen chloride by reacting potassium chloride and sulfuric acid. For this reason, they cannot be put in practical use for a long period of time.

Accordingly, it is an object of the present invention to provide an apparatus for producing an alkali metal salt of a mineral acid which is acid-resistant, heat-resistant and wear-resistant; which is of high energy efficiency; and in which the reaction mixture can be agitated, migrated and kneaded according to the state of the reaction mixture in the respective zones.

It is another object of the present invention to provide a process for producing an alkali metal salt of a mineral acid using the apparatus as described above.

The foregoing and other objects, features and advantages of the present invention will be apparent to those skilled in the art from the following detailed description taken in connection with the accompanying drawings in which:

FIG. 3 is a plan view, partly broken away and partly in cross-section, of an agitating means used in the apparatus;

FIG. 4 is a partly cut-away enlarged cross-sectional view of the agitating means, illustrating the manner in which the columnar agitating elements are attached to the shaft.

Figure 1:
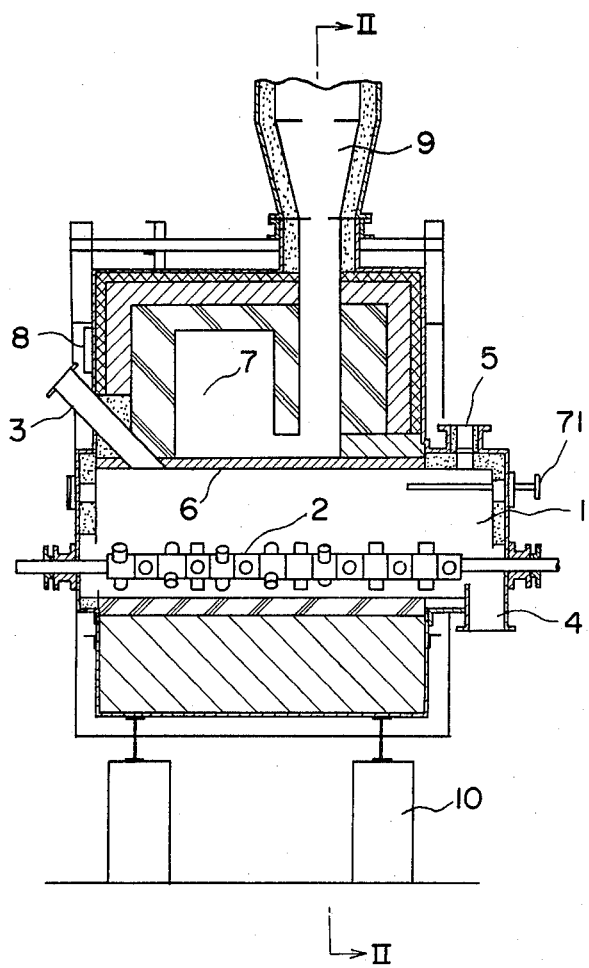
FIG. 1 is a longitudinal cross-sectional view of an apparatus for producing an alkali metal salt of a mineral acid according to the present invention.

In accordance with one aspect of the present invention, there is provided an apparatus for producing an alkali metal salt of a mineral acid from an alkali metal chloride and a mineral acid, comprising:

an elongated, acid- and heat-resistantly insulated muffle furnace provided with an upper muffle and having heating means mounted thereon via said muffle, raw material feeding means placed at its one end, reaction product discharging means placed at its other end, and generated gas exhausting means; and an agitating means comprising a pair of contra-rotating shafts placed in said muffle furnace to extend longitudinally thereof and equipped with a plurality of columnar agitating elements respectively, said pair of shafts and said plurality of agitating elements being disposed so as to impel forward the reaction mixture at least in a portion of the muffle furnace corresponding to the region where the liquid phase of the reaction mixture is substantially continuous and to forcibly knead the reaction mixture at least in a portion of the muffle furnace corresponding to the region where the solid phase of the reaction mixture is substantially continuous.

In accordance with another aspect of the present invention, there is provided a process for continuously producing an alkali metal salt of a mineral acid and hydrogen chloride from an alkali metal chloride and a mineral acid, comprising reacting an alkali metal chloride with a mineral acid in an apparatus as defined in claim 1, while allowing the state of the reaction mixture to be transferred from a slurry or capillary state to a pendular or dry state via a funicular II state and a funicular I state with the progress of the reaction, the reaction mixture being impelled forward at least in a zone ranging from the capillary state to the funicular I state, and being forcibly kneaded at least in a zone ranging from the funicular II state to the pendular state.

The term "reaction mixture" used herein is intended to mean any of mixtures of the reaction system, independently of the degree of reaction, present within the muffle furnace of the apparatus of the present invention.

The present invention will now be described, by way of example, with respect to the production of a potassium sulfate salt and hydrogen chloride by reacting potassium chloride with sulfuric acid.

By impelling the reaction mixture forward in the region where the liquid phase of the reaction mixture is substantially continuous, the state of the reaction mixture can be smoothly transferred from a slurry or capillary state to a pendular or dry state via a funicular II state and a funicular I state with the progress of the reaction and, at the same time, partial heating of the reaction mixture may be prevented, so that formation of lumps of solid potassium sulfate in which potassium chloride and potassium bisulfate are separately occluded is advantageously prevented. If the formation of such lumps of solid potassium sulfate has taken place, difficulties will be encountered in mechanical contact between potassium chloride and potassium bisulfate in the muffle furnace. As described above, the reaction mixture is impelled forward in the region where the liquid phase of the reaction mixture is substantially continuous and is forcibly kneaded in the region where the solid phase of the reaction mixture is substantially continuous, so that the intended reaction is promoted. Especially where the agitating means is adapted not to have a migration-causing capacity but to have only a kneading capacity at a portion of the muffle furnace corresponding to the region where the liquid phase of the reaction mixture is substantially discontinuous, the retention time of the reaction mixture in said region becomes the longer and the reaction is further promoted.

By employing the apparatus of the present invention having the characteristics as described above, potassium chloride is effectively reacted with such an amount of sulfuric acid as will cause the reaction mixture to be in a state of wet cake at the final reaction stage to produce a potassium sulfate salt having a satisfactorily small chlorine content. In addition, it should surprisingly be noted that even when sulfuric acid is employed in such an amount as will cause the reaction mixture to be in a dry state at the final reaction stage, a potassium sulfate salt of which the chlorine content is about one third or less that of a potassium sulfate salt produced by the use of the conventional apparatus can be produced.

The equivalent ratio of sulfuric acid to potassium chloride is represented by the formula $2[H_2SO_4]/[KCl]$ wherein [H₂SO₄] and [KCl] represent molar amounts of sulfuric acid and potassium chloride, respectively.

Sulfuric acid may be used at an equivalent ratio of sulfuric acid to potassium chloride of 1.00 to 1.40, preferably 1.03 to 1.20. Where the above-mentioned equivalent ratio is below 1.00, the chlorine content of the potassium sulfate product obtained by the reaction will be high. On the other hand, where the above-mentioned equivalent ratio is more than 1.40, the chlorine content of the product becomes less than 1.0 weight % in a short period of time, but, instead, the potassium bisulfate content of the product becomes about 55 weight % or more and, in addition, the reaction mixture at the final reaction stage is caused to assume a slurry-like state. Potassium bisulfate present in such an excessive amount will necessarily undergo decomposition, causing hydrogen chloride gas as a by-product to be contaminated with the decomposition products such as sulfur dioxide and sulfur trioxide.

Where the equivalent ratio of sulfuric acid to potassium chloride is in the above-mentioned preferred range, i.e., from 1.03 to 1.20, the reaction mixture at the final reaction stage assumes a funicular to pendular state as is shown in Table 2 (which will be given later) and can be effectively kneaded. Furthermore, where the equivalent ratio is in the range of from 1.03 to 1.20, the potassium sulfate product obtained by the reaction contains only a small amount of potassium bisulfate, and hence a small amount of neutralizing agent suffices to neutralize the same.

The kinds of states which the reaction mixture assumes in the muffle furnace of the apparatus according to the present invention are given in Table 1 below, together with their designations. Also given in Table 1 is indication of the range in which kneading is effected.

TABLE 1

| State | Dry | Pendular | Funicular I | Funicular II | Capillary | Slurry |
|---|---|---|---|---|---|---|
| Solid phase | continuous | continuous | continuous | continuous | discontinuous | discontinuous |
| Liquid phase | seemingly zero | discontinuous | continuous | continuous | continuous | continuous |
| Gas phase | continuous | continuous | continuous | discontinuous | zero | zero |
| Nomenclature by Atterberg | cohesionless | semi-cohesionless | | | sticky | muddy |
| Kneading | | ← | | → | | |

The term "potassium sulfate salt" used herein is intended to mean a potassium sulfate product containing normal salt as a main component, and further containing potassium bisulfate and other potassium salts of sulfuric acid such as potassium pyrosulfate in amounts such as will not be a substantial obstacle to the subsequent processes for the preparation of potassium-containing chemical manures or to the composition of the final chemical manures.

Figure 2:
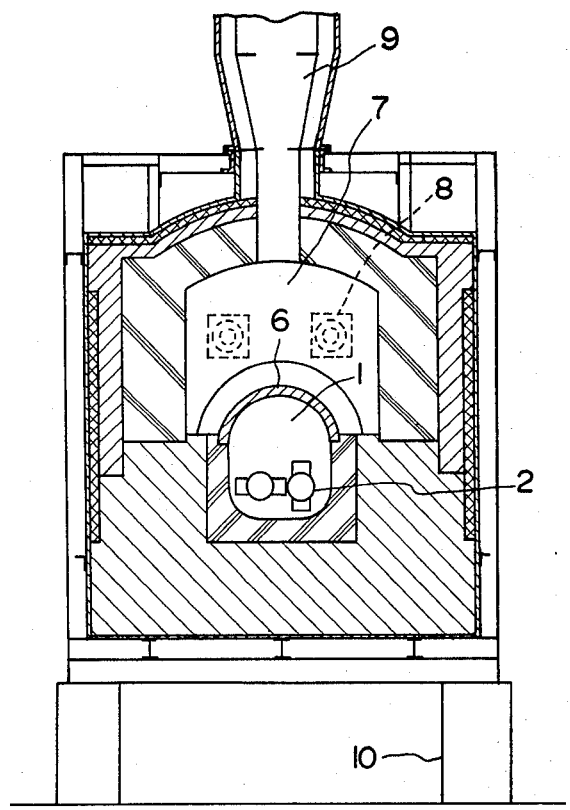
FIG. 2 is a view taken on line II—II of FIG. 1 showing a lateral cross-section of the apparatus.

Referring to FIG. 1 and FIG. 2, there is shown an apparatus embodying the present invention. The apparatus comprises a horizontal type cylindrical muffle furnace 1 and an agitating means 2 provided in said muffle furnace 1 so that their respective longitudinal axes are parallel to each other. The muffle furnace 1 is provided at one end thereof with a raw material-feeding spout 3 and at the other end thereof with an outlet 4 for discharging the reaction product, an outlet 5 for hydrogen chloride gas generated as a by-product, and a neutralizing agent-feeding spout 71. The agitating means 2 comprises a pair of shafts and a plurality of agitating elements securely attached to each of said shafts. The above-mentioned raw material-feeding spout 3, reaction product outlet 4, by-produced hydrogen chloride gas outlet 5, and neutralizing agent-feeding spout 71 are connected respectively to a raw material-feeding means (not shown), a reaction product-taking out means (not shown), a by-produced hydrogen chloride gas-scrubbing means (not shown), and a neutralizing agent-feeding means (not shown). The muffle 6 which constitutes the upper wall of the muffle furnace 1 is made of a material composed mainly of silicon carbide and on the muffle 6 is disposed a combustion chamber 7. Reference numeral 8 designates a heavy oil burner of the combustion chamber 7 and reference numeral 9 designates an outlet for the combustion gas. The entire apparatus rests on the bed 10.

The cross-sectional form of the muffle furnace 1 of the present invention is not limited to a particular form, but there should be employed such a form as will not cause, during the operation of the apparatus, the formation of a so-called dead zone of heating in which the application of heat to the reaction mixture is insufficient and unreacted lumps of the reaction materials tend to be unfavorably formed. The interior of the muffle furnace 1 is lined with a material having a small porosity such as a chamotte type acid- and fire-resistant brick in order that the muffle furnace 1 can withstand the high acidity and high temperature involved in the reaction for producing an alkali metal salt of a mineral acid such as potassium sulfate.

As depicted in FIG. 3, the agitating means 2 comprises a pair of shafts, 11 and 11A, and a plurality of columnar agitating elements, 13 and 13A, securely attached to each of said shafts 11 and 11A. The shafts 11 and 11A are adapted to contra-rotate, that is, adapted to rotate in two different directions, i.e., counter to each other so that the shafts rotate in either inward or outward directions as indicated by the arrows in FIG. 3. In the case where the shafts 11 and 11A have the same direction of rotation, sufficient kneading of the reaction mixture at the final reaction stage cannot be attained. Furthermore, from the viewpoint of better kneading, it is preferred that the agitating shafts 11 and 11A, which have mutually opposite directions of rotation, contra-rotate inwardly as seen from above. Passageways 12 and 12A are provided longitudinally within the respective shafts 11 and 11A which allow the passage of a refrigerant through the shafts 11 and 11A so that the refrigerant may cause the reaction mixture present in the muffle furnace 1 in contact with the shafts 11 and 11A to harden to thereby form an auxiliary acid- and heat-resistant layer for the shafts 11 and 11A. The form of the agitating elements 13 and 13A of the present invention is not limited to a particular form, and a columnar form (any of circular, square, triangular and polygonal forms in cross-section may be adopted), a flat plate form, a form which is, as a whole, twisted, etc, are usable. However, agitating elements of a columnar form are most preferred from viewpoints of mechanical strength, resistance to acids and heat, easiness in replacement when the agitating elements have been worn out, etc.

The manner of arrangement in which the agitating elements 13 and 13A are attached to the respective shafts 11 and 11A is very important in the apparatus of the present invention because, depending on the arrangement, the reaction mixture can be suitably impelled to migrate from left to right in the muffle furnace as viewed in FIG. 1 and can be retained in the region, in which the reaction mixture is vigorously kneaded to attain an effective reaction. When the agitating means of the apparatus of the present invention is said to have a capacity for impelling the reaction mixture to migrate, it naturally means that the agitating means also has a capacity for agitating the reaction mixture.

One of the characteristics of the arrangement of the agitating elements 13 and 13A according to the present invention is as follows. At least in the region where the liquid phase of the reaction mixture is continuous, the agitating elements 13 and 13A are attached to each of the shafts 11 and 11A in such an arrangement that the rotation of the shafts 11 and 11A can forcibly cause the migration of the reaction mixture. In other words, as is illustrated on the left side of the break lines in FIG. 3, the agitating elements 13 and 13A (13, 13-1, 13-2, 13-3, etc and 13A, 13A-1, 13A-2, 13A-3, etc), at least in the first, about one-half portion, preferably in the first, about two-third portion, of the muffle furnace 1, are disposed on the peripheries of the respective shafts 11 and 11A in staggered relationship at a predetermined angle so that both the line connecting the agitating elements 13, 13-1, 13-2 and 13-3 and the line connecting the agitating elements 13A, 13A-1, 13A-2 and 13A-3 assume helical loci. Where the staggering angle between the longitudinally adjacent agitating elements is in the range of about 30° to 70°, even a reaction mixture in a liquid-excess state can be impelled to migrate, but from the viewpoint of easiness in production, it is preferred that the staggering angle be about 45°.

The agitating elements 13 and 13A disposed helically on the peripheries of the respective shafts 11 and 11A should be spaced one from another in the longitudinal direction of the shafts, by a spacing greater than zero and smaller than the width of each of the agitating elements. Where the spacing is greater than the width of each of the agitating elements, the capacity of the agitating means 2 to cause the migration of the reaction mixture is lowered and, on the other hand, where no spacing is provided to arrange the agitating elements continuously, the capacity of the agitating means 2 to cause the migration of the reaction mixture becomes too great. The agitating means that has too great a migration-causing power will have too small an agitating power, and vice versa.

The helical disposal of the agitating elements, which can forcibly cause the migration of the reaction mixture, may alternatively be extended over the entire length of the shafts 11 and 11A corresponding not only to the region where the liquid phase of the reaction mixture is continuous, but also to the region where the liquid phase of the reaction mixture is discontinuous, but the helical disposition of the agitating elements is advantageously limited to the portion corresponding to the first, liquid phase-continuous region so that the agitating means has not a forcible migrating capacity for the reaction mixture in the latter liquid phase-discontinuous region, thereby causing the retention time of the reaction mixture in the latter liquid phase-discontinuous region to be prolonged to effect sufficient kneading. In this connection, for example, in case the number of agitating elements attached to one shaft at the same distance from the end of the shaft is two, if the staggering angle is set at 90° as shown in FIG. 3, there is not caused any forcible migrating capacity.

Another characteristic of the arrangement of the agitating elements 13 and 13A according to the present invention is as follows. At least in the region where the solid phase of the reaction mixture is continuous, the agitating elements 13 and 13A are attached to the respective shafts 11 and 11A in such an arrangement that the agitating means can forcibly knead the reaction mixture. In other words, as is illustrated on the right side of the break lines in FIG. 3, the arrangement of the agitating elements 13 and 13A, in the latter, about one-half portion, preferably in the latter, about one-third portion, of the muffle furnace 1, is such that the agitating elements 13 and 13A are disposed substantially at the same distance from the end of the pair of shafts 11 and 11A and, at the same time, the distance between the axes of the respective shafts 11 and 11A is determined so that the agitating elements 13 and 13A attached to the respective shafts 11 and 11A can intervene with each other as the shafts 11 and 11A rotate. From the viewpoint of the effect of scraping the reaction mixture off the shafts 11 and 11A, it is preferred that the degree of mutual intervening of the agitating elements be as high as possible, but practically about ½ or more of the length of the agitating element, preferably about ⅔ or more. The above-mentioned arrangement of the agitating elements 13 and 13A may preferably be extended to the portion corresponding to the first, liquid phase-continuous region as shown in FIG. 3, whereby the reaction mixture forcibly migrated from the initial reaction zone becomes a pendular state in the final reaction zone in which the reaction mixture is retained and subjected to forcible kneading so that the reaction mixture is sufficiently kneaded while being sheared. From the viewpoint of the effect of kneading, the number of agitating elements attached to one shaft at the same distance from the end of the shaft may preferably be two or three, and provision of one agitating element is insufficient.

The structure of the columnar agitating elements 13 and 13A and of the shafts 11 and 11A will now be described with reference to FIG. 4. As illustrated in FIG. 4, a metal arm 14, which will serve as a core of the agitating element 13, is formed integrally with a hollow cylindrical short-length metal holder 15. The metal arm 14 is encased by a cylindrical outer casing 16 made of a ceramic material and having its top opened, and the interior of the cylindrical outer casing 16 is filled, up to a height of from the top of the metal arm 14 to the top of the cylindrical outer casing 16, with an acid-resistant thermosetting castable 17 so that the metal arm 14 can be buried. The cylindrical outer casing 16 is, at the same time, fixed to the metal arm 14 by the castable 17. The shaft 11 is fitted into the hollow cylindrical short-length metal holder 15. Alternatively, the metal arm may be of any form and be directly mounted, not through the hollow metal holder, on the shaft 11 by, for example, welding. In the instant embodiment also, it is necessary to bury the metal arm within the ceramic cylindrical outer casing by means of a castable. The shaft 11 has a passageway 12 for a refrigerant therein. On the exterior of the cylindrical metal holder 15 is provided a first layer 18 of an acid-resistant thermosetting castable to protect the metal holder 15 and the shaft 11. It is preferred in the apparatus of the present invention that a second layer 19 be further provided on the exterior of the first layer 18, which second layer 19 is formed by allowing the passage of a refrigerant through the passageway 12. As described, the passage of a refrigerant through the passageway 12 causes the reaction mixture in the muffle furnace and in contact with the first layer 18 or the hollow metal holder 15 to harden into an auxiliary layer, that is, the second layer. Either one of the first and second layers will suffice for protecting the shaft 11, but the co-provision of the two layers is advantageous in that, in the event that cracks and/or exfoliated portions are formed in the first layer 18, the second layer 19 (still in the form of a fluid reaction mixture) serves to recondition the first layer 18 by getting in and hardening at the cracks and/or exfoliated portions, thereby enabling the lifetime of the shaft 11 to be prolonged. In this connection, it should be noted that, once formed, the second layer 19 has such a highly heat-insulating property that the heat loss resulting from the passage of a refrigerant through the passageway 12 of the shaft 11 is negligible.

Figure 5:
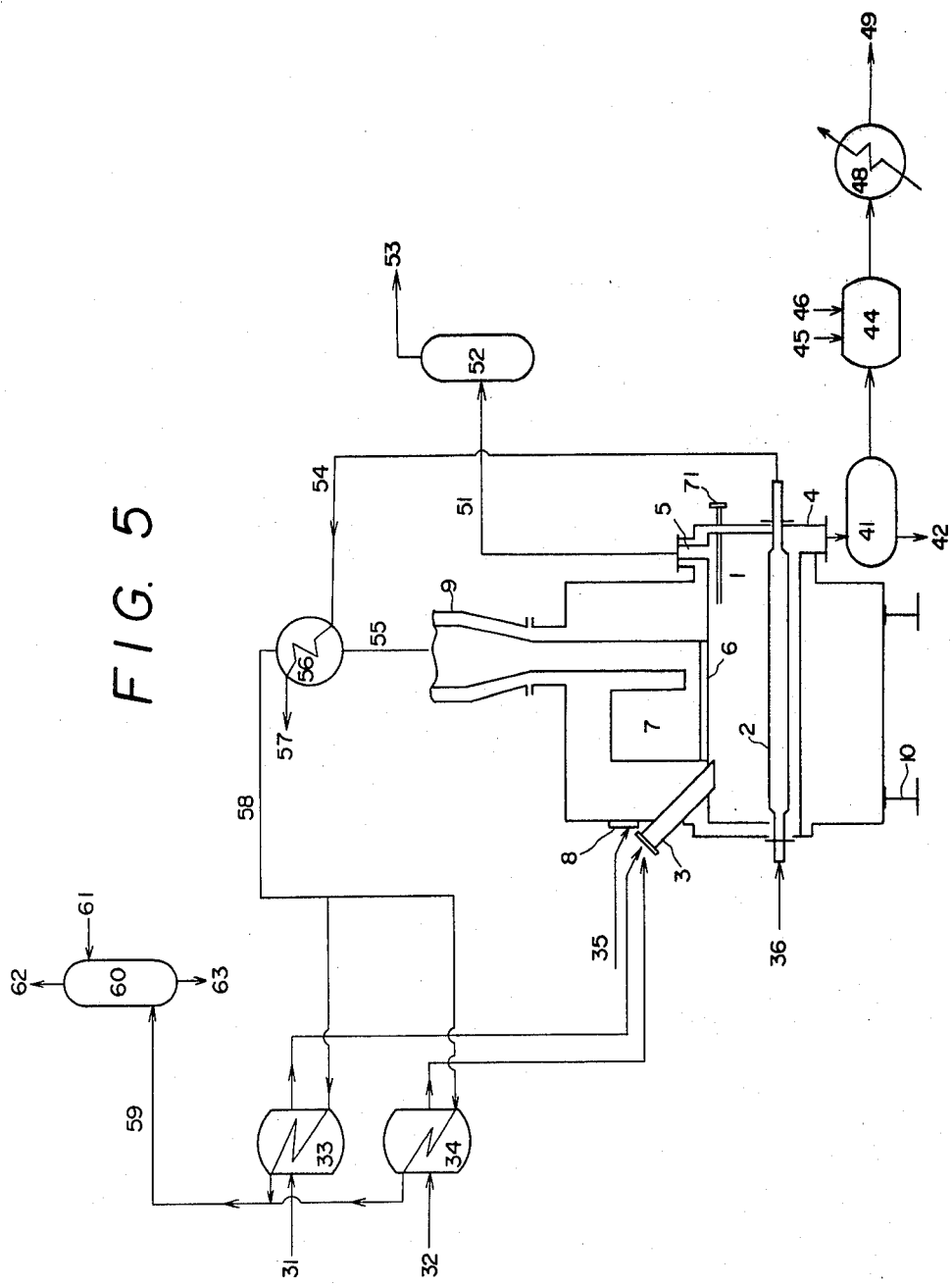
FIG. 5 is a flow diagram of the process for producing potassium sulfate using the apparatus as described above.

The apparatus of the present invention thus constructed is advantageously used for the production of a potassium sulfate salt and hydrogen coloride by reacting potassium chloride and sulfuric acid according to, for example, the flow diagram of process as shown in FIG. 5.

Referring to FIG. 5, the raw materials, potassium chloride 31 and sulfuric acid 32, are first preheated respectively in the preheaters 33 and 34, and then fed through the raw material-feeding spout 3 into the muffle furnace 1. As the preheater 33 for potassium chloride 31, there can be employed a conventional rotary dryer. However, from the viewpoint of efficiency, it is preferred to employ a conventional heater of the fluidized bed type. Alternatively, the raw materials may be premixed at ordinary temperature in a premixer or the like and then fed into the muffle furnace 1 without being preheated.

As described, the agitating means 2 of the apparatus according to the present invention has a capacity for impelling the reaction mixture forward at least in the region where the liquid phase of the reaction mixture is continuous. Due to the feature of the agitating means 2 as mentioned above, the reaction materials in the muffle furnace 1 can advantageously be reacted with each other in different zones depending upon the state which the reaction mixture assumes. Hence, even a reaction mixture of sulfuric acid 32 and potassium chloride 31 in an equivalent ratio of sulfuric acid to potassium chloride of 1.00 to 1.40 and in an acid-excess state can be sufficiently agitated and admixed while being migrated in the region where the liquid phase of the reaction mixture is continuous. As described, the agitating means 2 has an agitating element-arrangement suitable for kneading the reaction mixture at least in the region where the solid phase of the reaction mixture is continuous, and the reaction mixture of a funicular II-I to pendular state which is in the solid phase-continuous region is sufficiently kneaded, so that a minute amount of potassium chloride remaining in the lump granules of potassium sulfate produced is caused to be exposed and reacted with potassium bisulfate present relatively in a large quantity in the surroundings. During the entire course of the reaction, the reaction mixture inside the muffle furnace 1 is maintained at a temperature of from the melting point of potassium bisulfate to 500° C., preferably at a temperature of from 300° C. to 450° C. by the heat generated by the heavy oil burner 8 of the combustion chamber 7 and transferred through the muffle 6 of the muffle furnace 1.

Thus, using the apparatus of the present invention, there can be continuously and stably produced potassium sulfate of which the chlorine content is as low as 0.5% by weight or less by reacting sulfuric acid and potassium chloride under relatively mild conditions. The apparatus of the present invention makes it possible that the reaction is completed within a shortened period of time of 0.5 to 2 hours. Furthermore, as mentioned above, by using the apparatus of the present invention, the reaction may be accomplished at a relatively low reaction temperature of from the melting point of potassium bisulfate to 500° C., and hence, unfavorable decomposition of potassium bisulfate is suppressed. As a result, hydrogen chloride gas which is free of contamination with the decomposition products of potassium bisulfate such as sulfur dioxide can be obtained as a by-product.

In addition, the highly acid- and heat-resistant structural characteristics of the muffle furnace 1 and the agitating means 2 of the apparatus of the present invention enable the apparatus to satisfactorily withstand its continuous and long-term use under high acidity and high temperature conditions and thereby lead the same to be usable in the production of potassium sulfate advantageously on an industrial scale. In addition, even when potassium chloride is reacted with a stoichiometric amount of sulfuric acid, i.e., not with excess sulfuric acid, the apparatus of the present invention compares favorably with conventional apparatus in effectively advancing the reaction, and stably and easily producing potassium sulfate having a satisfactorily small chlorine content.

Now, referring to the flow diagram of a process in FIG. 5, the potassium bisulfate-containing potassium sulfate obtained by the reaction of potassium chloride with excess sulfuric acid is discharged from the muffle furnace 1 through the reaction product outlet 4 and is cooled in a reaction product cooler 41 and thereafter is collected as a final product 42. Alternatively, after having been cooled in the reaction product cooler 41 the potassium bisulfate-containing potassium sulfate (hereinafter referred to as "output") may be pelletized by means of a granulator 44. In that case, the output is mixed and kneaded in the granulator 44 with hydrated lime 45 and water 46, and is dried in a dryer 48 and is then collected as a final product 49 in the form of granular potassium sulfate salt.

According to need, the potassium bisulfate contained in the output may be neutralized. Neutralization of the potassium bisulfate may be effected by cooling the output discharged from the muffle furnace 1 in the reaction product cooler 41, pulverizing the output, and sufficiently mixing the output with a neutralizing agent, for example, hydrated lime plus a small amount of water, followed by drying (hereinafter referred to as "indirect neutralization method"). Alternatively, the potassium bisulfate contained in the potassium bisulfate-containing potassium sulfate can be better neutralized if a neutralizing agent such as calcium carbonate is directly added, through the neutralizing agent-feeding spout 71, to the potassium sulfate obtained by the reaction and located in the final reaction zone inside the muffle furnace 1 (hereinafter referred to as "direct neutralization method"). For the following reasons, the direct neutralization method is advantageous: (i) the procedures of neutralization are extremely simplified, (ii) chemical neutralization is attained, whereas there is attained mainly a mechanical mixing in the indirect neutralization method, and (iii) because there is attained mainly a mechanical mixing in the indirect neutralization method, the finally obtained product inevitably undergoes classification of its components and disuniformity in composition during the storage and transportation thereof. On the other hand, the product obtained by the direct neutralization method does not undergo the above-mentioned unfavorable phenomenon.

The neutralization of potassium bisulfate contained in the product may be effected up to a desired level.

The hydrogen chloride gas 51 as the by-product is discharged from the muffle furnace 1 through the by-produced hydrogen chloride gas outlet 5 and is scrubbed in the scrubber 52 to form refined hydrogen chloride gas 53. The combustion gas 55 is discharged from the combustion chamber 7 through the combustion gas outlet 9 and is subjected to heat exchange, in a heat recovering apparatus 56, with hot water 54, which has originally been the refrigerant for the shafts 11 and 11A. The combustion gas 55 is then utilized as the heat source for the above-mentioned preheaters 33 and 34, and is scrubbed in a combustion gas scrubber 60 to be given off into the air. Numeral 61 designates industrial water and numeral 63 waste water. The reaction product taken out of the muffle furnace 1 is advantageously cooled by the following method. Reaction product which has been already cooled is pooled in a large quantity under the reaction product outlet 4 and the reaction product is discharged by little from the muffle furnace into the pooled reaction product while circulating the pooled reaction product. By cooling the reaction product in the above-mentioned manner, the formation of cooler scale can be prevented.

As described before and is apparent from the results of the Examples (which will be given later), according to the present invention, there can be achieved various advantages as follows:

(1) Since a mineral acid can be effectively reacted with an alkali metal chloride even at an equivalent ratio of a mineral acid to an alkali metal chloride of about 1.00 to 1.40, an alkali metal salt of a mineral acid having a small chlorine content can be produced in one step and in a short period of time. As a result, the production capacity per furnace is increased with a leap to 3 times that of the apparatus disclosed in Japanese Patent Application Publication No. 2264/1960.

In other words, a conventional apparatus such as that disclosed in Japanese Patent Application Publication No. 2264/1960 does not have, in the muffle furnace thereof, an agitating means capable of forcibly kneading the reaction mixture while allowing the reaction mixture to migrate from the initial reaction zone where the reaction mixture assumes a slurry state to the final reaction zone where the reaction mixture assumes a dry state. Accordingly, in the production of an alkali metal salt of a mineral acid by the use of the conventional apparatus, it is necessary that the reaction mixture inside the muffle furnace be maintained substantially in a dry state. The result of the above is that the reaction rate is determined by the rate of penetration of the liquid into the solid granules of the reaction material, and hence it takes a long time of about 3 to 5 hours before the reaction is completed. On the other hand, in the case of the apparatus of the present invention, the agitating means is capable of kneading the reaction mixture while allowing the same to migrate from left to right inside the muffle furnace as viewed in FIG. 1 and capable of effecting the reaction in different zones depending upon the state which the reaction mixture assumes. Accordingly, it is possible that most of the reaction proceeds with the reaction mixture being in a wet state. In this case, the rate of reaction is determined by heat conduction to the reaction mixture, and hence the reaction can be completed in a short time of about 0.5 to 2 hours.

(2) The increase in production capacity per furnace with a leap to 3 times that of the prior art apparatus makes it possible that fuel consumption is greatly reduced. Furthermore, due to the increased agitation-mixing capacity of the agitating means at the portion corresponding to the initial reaction zone and to the migration-causing capacity of the agitating means, which prevents the raw materials fed into the initial reaction zone from retaining therein, the raw materials can be directly fed into the muffle furnace without being pre-mixed, leading to such an advantage that the combustion gas discharged from the combustion chamber can be utilized for preheating the raw materials prior to feeding thereof into the muffle furnace. As a result, better heat efficiency is realized. Furthermore, as a result of the increased capacity of the agitating means of the present invention to cause the migration of the reaction mixture in the muffle furnace, the amount of the reaction mixture to be retained in the muffle furnace is reduced, and hence the apparatus of the present invention can continuously produce an alkali metal salt of a mineral acid such as a potassium sulfate salt with less power consumption.

(3) The highly acid-resistant, heat-resistant, and wear-resistant properties of the muffle furnace and the agitating means according to the present invention make it possible that the maintenance cost thereof is greatly reduced.

(4) Even when an alkali metal chloride such as potassium chloride is reacted with a stoichiometrically equivalent amount of sulfuric acid, the apparatus of the present invention is capable of producing potassium sulfate of which the chlorine content is about one third or less that of potassium sulfate produced by the use of the prior art apparatus, for example, the one as disclosed in Japanese Patent Application Publication No. 2264/1960.

The present invention will now be described in detail with reference to the following Examples that by no means limit the scope of the present invention.

Examples 1 to 4 and Comparative Examples 4-6

A muffle furnace having the same structure as that shown in FIG. 1 was used. The muffle furnace had a height of 600 mm, a width of 500 mm, and a length of 1800 mm. The muffle constituting the upper wall of the muffle furnace was made of silicon carbide and was semicircular in cross section. The muffle had a diameter of 500 mm and a length of 800 mm. The interior of the muffle furnace, exclusive of the part corresponding to the upper wall, was lined with a chamotte type brick having a low porosity. In the muffle furnace was provided an agitating means having two shafts so that the longitudinal axis of the muffle furnace and the agitating means were parallel to each other. SUS304 (stainless steel)-made hollow shafts were exployed as the above-mentioned shafts, and the shafts each had a passageway therein for a refrigerant, which passageway had an inner diameter of 30 mm, an outer diameter of 64 mm, and a length of 2600 mm. Agitating elements were provided on each of the shafts as illustrated in FIGS. 3 and 4. Illustratively stated, fourteen cylindrical metal holders each having an outer diameter of 80 mm, an inner diameter of 65 mm, and a length of 120 mm were mounted, with no spacing between them, on each of the shafts which extends through the metal holders. Each of the fourteen metal holders had two SUS304-made arms formed integrally therewith and disposed circumferentially on the outer periphery of the same at an interval of 180° from each other. The metal arms had a dimeter of 30 mm and a height of 60 mm. The two metal arms on a metal holder each were encased in a cylindrical outer casing of silicon carbide which has an outer diameter of 90 mm, an inner diameter of 60 mm, and a height of 90 mm. The interior of the cylindrical outer casing was densely filled, up to a height such as covers the top of the metal arm, with a mullite-type thermosetting castable, followed by heat-treatment at 120° C. to allow the same to harden. In Examples 1, 2, 3 and 4, the disposal of agitating elements on each of the shafts was such that, at the portion corresponding to the first, two-third reaction zone, that is, a portion corresponding to a distance of up to 1200 mm from the inlet end of the muffle furnace where raw materials are fed, agitating elements (20 agitating elements: 2 agitating elements per metal holder ×10 metal holders) were disposed helically (so as to assume two helical imaginary lines) at a staggering angle between the longitudinally adjacent agitating elements of 45° so that the agitating means can have a migration-causing capacity. On the other hand, at the portion corresponding to the latter, one-third reaction zone, that is, a portion corresponding to after a distance of 1200 mm from the inlet end of the muffle furnace, agitating elements (8 agitating elements: 2 per metal holder ×4 metal holders) were disposed at a staggering angle between the longitudinally adjacent agitating elements of 90° so that no migration-causing capacity was imparted. In Comparative Examples 4, 5 and 6 however, the staggering angle at an entire portion corresponding to the entire reaction zone was 45°, so that the agitating means has a migration-causing capacity also at the portion corresponding to the latter, one-third reaction zone. The two agitating elements attached to one shaft through the medium of a hollow metal holder and the corresponding two agitating elements attached to the other shaft through a hollow metal holder were located at the same distance from the end of the pair of shafts. Furthermore, in providing a pair of shafts in the reactor, the distance between the axes of the respective shafts was so determined that the agitating elements attached to the respective shafts (including those located in the portion corresponding to the first, liquid phase-continuous region) could intervene with each other as the agitating means rotated.

The shafts had opposite, inward rotation and rotated at 20 rpm. A refrigerant of water was allowed to pass through each of the refrigerant passageways provided in the shafts at a rate of 15 liters/hr. Heavy oil was subjected to combustion by the use of a heavy oil-burner and the temperature inside the combustion chamber was maintained at a temperature of from 1,300° C. to 1,500° C.

In Example 1, about 152 Kg per hous of potassium chloride of a common industrial grade having a purity of about 98% and 100 Kg per hour of sulfuric acid having a purity of about 98% were continuously fed into the muffle furnace as described above. In Examples 2, 3, and 4, and Comparative Examples 4, 5 and 6, the amount of potassium chloride employed was the same, but the amount of sulfuric acid was varied, namely, 103 Kg per hour, 107 Kg per hour, 110 Kg per hour, 120 Kg per hour, 130 Kg per hour and 110 Kg per hour. The heat quantity supplied was adjusted so that the temperature of the reaction mixture at the central portion of the muffle furnace was in the range of 400° C. to 450° C. The state which the reaction mixture assumes at a given point in the muffle furnace varies depending upon the equivalent ratio of sulfuric acid to potassium chloride employed. In Examples 2, 3 and 4, and Comparative Examples 4 and 6, the raw materials on entering the muffle furnace through the raw material-feeding spout became a slurry and assumed a funicular I or a pendular state at the final reaction stage. In Example 1, the reaction mixture assumed a dry state alreadly at the beginning of the final reaction stage. In Examples 1 through 4, there was observed an almost complete migration, i.e., without partial stagnation, of the reaction mixture in the zones in which the reaction mixture respectively assumed a slurry and capillary state. Similarly, in the region where the solid phase of the reaction mixture is continuous and where the reaction mixture had a high degree of viscosity (from the funicular II-state zone and funicular I-state zone to part of the pendular-state zone), most of the reaction mixture was retained in the doughnut-shaped space which was formed by the cooperation of the top portion of the agitating element with the surface of the second layer of the rotating shaft, and was vigorously kneaded and impelled to migrate toward the outlet of the muffle furnace. In Comparative Examples 4–6, the reaction mixture was sufficiently impelled to migrate from the inlet end to the outlet end of the muffle furnace while being kneaded in the region where the solid phase of the reaction mixture is continuous.

The equivalent ratio of sulfuric acid to potassium chloride and other operation conditions employed in each of the Examples 1, 2, 3 and 4, and Comparative Examples 4, 5 and 6 are given in Table 2 below, together with the chlorine content and the potassium bisulfate content of the resultant potassium sulfate salt product. The reaction mixture-agitating, kneading and migrating effects of the apparatus of the present invention were visually evaluated in each of the Examples 1 through 4 and Comparative Examples 4–6 and the results are also given in Table 2 together with the state the reaction mixture assumed at the final reaction stage and the average retention time of the reaction mixture within the muffle furnace.

Comparative Examples 1 to 3

Comparative Examples 1 to 3 were conducted under substantially the same operation conditions as described in Examples 1 to 4 and Comparative Examples 4–6 except that the number of agitating elements per metal holder (or the number of agitating elements at the same distance from the end of the shaft), the staggering angle, the manner of disposal of the agitating elements on the shafts and the direction of rotation of the shafts were varied. In Comparative Example 3, the agitating elements were attached to the shafts in such a manner that the agitating elements attached to the respective shafts do not rotate in the common vertical plane. The agitating elements on one shaft and those on the other shaft were arranged so that the former and the latter were located at different distances from the end of the pair of shafts.

TABLE 2

| Reaction conditions | Reaction conditions and results | | Example No. | | | | | | Comparative Example No. | | | | |
|---|---|---|---|---|---|---|---|---|---|---|---|---|---|
| | | | 1 | 2 | 3 | 4 | 4 | 5 | 6 | 1 | 2 | 3 |
| Reaction conditions | Equivalent ratio, $2[H_2SO_4]/[KCl]$ | | 1.00 | 1.03 | 1.07 | 1.10 | 1.20 | 1.30 | 1.10 | 1.10 | 1.10 | 1.10 |
| | Designing of agitating means | staggering angle in first, two-third reaction zone | 45 | 45 | 45 | 45 | 45 | 45 | 45 | 90 | 120 | 45 |
| | | staggering angle in latter, one-third reaction zone | 90 | 90 | 90 | 90 | 45 | 45 | 45 | 90 | 120 | 90 |
| | | number of agitating elements per holder | 2 | 2 | 2 | 2 | 2 | 2 | 2 | 2 | 1 | 2 |
| | | directions of rotation of shafts | opposite, inward | opposite, inward | opposite, inward | opposite, inward | opposite, inward | opposite, inward | opposite, inward | opposite, inward | opposite, outward | opposite, inward |
| | | presence or absence of intervening of agitating elements in the common vertical plane of rotation | present | present | present | present | present | present | present | present | present | absent |
| Results | Analysis | Cl (%) | 0.8 | 0.4 | 0.2 | 0.1 | 0.1 | not more than 0.1 | 0.8 | — | — | — |
| | State in Reactor | $KHSO_4$ (%) | 3.0 | 5.0 | 8.0 | 15.0 | 20.0 | 40.0 | 16.0 | — | — | — |
| | | mixing effect in the reaction zone where mixing is caused | O | O | O | O | O | O | O | O | △ | △ |
| | | kneading effect in the reaction zone where kneading is caused | △ | O | O | O | O | △ | △ | O | X | X |
| | | state of reaction system in final reaction zone | dry | pendular | pendular | pendular | funicular I | funicular II | pendular | pendular | pendular | pendular |
| | | migration-causing effect in entire reaction zone | O | O | O | O | O | O | O | X | X | X |
| | | retention time (hr) | 0.5 | 0.5 | 0.5 | 0.5 | 0.5 | 0.5 | 0.25 | — | — | — |
| | | visual evaluation of operation | O | O | O | O | O | O | △ | Blockage observed at center portion of reactor. Impossible to continue operation. | Scale to shafts. Lowering of kneading capacity and migration-causing capacity observed. | Fluctuation of amount of reaction mixture retained in reactor. Blockage observed. |

Note: O, △, and X indicate "good", "fairly good", and "poor", respectively.

What is claimed is:

1. In an apparatus for producing a potassium sulfate salt potassium chloride and sulfuric acid comprising a horizontally elongated muffle furnace provided with a raw material inlet at one end thereof and a reaction product outlet at the other end thereof, means for heating the furnace, means for feeding raw materials associated with the inlet, means for discharging a reaction product associated with the outlet, means for exhausting a generated gas and agitating means provided in the muffle furnace, said agitating means comprising a pair of contra-rotating shafts extending longitudinally through the muffle furnace in parallel and provided with a plurality of agitating elements arranged longitudinally and circumferentially on the shafts at a predetermined angle between the nearest longitudinally adjacent agitating elements in the circumferential direction, the distance between the pair of contra-rotating shafts being kept so that the agitating elements on one of the pair of contra-rotating shafts intervene with the corresponding agitating elements of the other contra-rotating shaft on a common plane of rotation thereof;

the improvement in which each of said pair of shafts comprises:
a first portion on the end of each shaft nearest the raw material inlet,
a second portion on the end of each shaft nearest the reaction product outlet,
a plurality of sets of agitating elements arranged longitudinally over the entire length of the shaft, each set comprising at least two agitating elements arranged circumferentially on the shaft at the same distance from the end of the shaft, and
wherein the smallest angle between the nearest longitudinally adjacent agitating elements in the circumferential direction is from about 30° to about 70° in said first portion and is about 90° in said second portion.

2. An apparatus according to claim 1, wherein the angle between the longitudinally adjacent agitating elements in the circumferential direction in the first portion of each of the shafts is about 45°.

3. An apparatus according to claim 1 or 2, wherein said first portion of each of the shafts extends at least half the length of the furnace.

4. An apparatus according to claim 1 or 2, wherein said first portion of each of the shafts extends about two-thirds the length of the furnace.

5. An apparatus according to claim 1, wherein
each of the plurality of agitating elements is columnar and further comprises,
a metal arm immovably attached directly or indirectly to each of the pair of the shafts,
a ceramic cylindrical outer casing having its top opened and encasing therein said metal arm, and
an acid-resistant thermosetting castable material cast in said ceramic cylindrical outer casing up to a height such as covers the top of said metal arm.

6. An apparatus according to claim 1, wherein each of the shafts further comprises:
a first layer made of an acid-resistant thermosetting castable material on the exterior of each of the shafts, and
a hollow passageway in each of the shafts, through which a refrigerant is permitted to pass, thereby enabling the reaction mixture in contact with each of the shafts to be solidifed to form a second layer on the exterior of the first layer of each of the shafts.

7. An apparatus according to claim 1, wherein the furnace also includes a neutralizing agent-feeding spout on the side of the reaction poduct outlet.

* * * * *

UNITED STATES PATENT AND TRADEMARK OFFICE
CERTIFICATE OF CORRECTION

PATENT NO. : 4,427,637

DATED : January 24, 1984

INVENTOR(S) : IWASHITA et al

It is certified that error appears in the above—identified patent and that said Letters Patent is hereby corrected as shown below:

Claim 1, line 2, after "salt" insert --from--; and

Claim 7, line 3, change "poduct" to --product--.

Change the title to read --AN APPARATUS FOR PRODUCING AN ALKALI METAL SALT OF A MINERAL ACID--.

Column 3, line 50, change "an" to --a--;

Delete lines 51 through 68 in column 3, and lines 1 through 17 in column 4 and substitute therefor --potassium sulfate salt from potassium chloride and sulfuric acid, comprising:

a horizontally elongated muffle furnace provided with a raw material inlet at one end thereof and a reaction product outlet at the other end thereof, means for heating the furnace, means for feeding raw materials associated with the inlet, means for discharging a reaction product associated with the outlet, means for exhausting a generated gas and agitating means provided in the muffle furnace, said agitating means comprising a pair of contra-rotating shafts extending longitudinally through the muffle furnace in parallel and provided with a plurality of agitating elements arranged longitudinally and circumferentially on the shafts at a predetermined angle between the nearest longitudinally adjacent agitating elements in the

UNITED STATES PATENT AND TRADEMARK OFFICE
CERTIFICATE OF CORRECTION

PATENT NO. : 4,427,637

DATED : January 24, 1984

Page 2 of 2

INVENTOR(S) : IWASHITA et al

It is certified that error appears in the above—identified patent and that said Letters Patent is hereby corrected as shown below:

circumferential direction, the distance between the pair of contra-rotating shafts being kept so that the agitating elements on one of the pair of contra-rotating shafts intervene with the corresponding agitating elements of the other contra-rotating shaft on a common plane of rotation thereof; the improvement in which each of the pair of shafts comprises: a first portion on the end of each shaft nearest the raw material inlet, a second portion on the end of each shaft nearest the reaction product outlet, a plurality of sets of agitating elements arranged longitudinally over the entire length of the shaft, each set comprising at least two agitating elements arranged circumferentially on the shaft at the same distance from the end of the shaft, and wherein the smallest angle between the nearest longitudinally adjacent agitating elements in the circumferential direction is from about 30° to about 70° in the first portion and is about 90° in the second portion.--

Signed and Sealed this

Twenty-fourth Day of April 1984

[SEAL]

Attest:

GERALD J. MOSSINGHOFF

Attesting Officer

Commissioner of Patents and Trademarks